US012519197B2

(12) United States Patent
Di Martino et al.

(10) Patent No.: US 12,519,197 B2
(45) Date of Patent: Jan. 6, 2026

(54) APPARATUS, A SYSTEM AND A METHOD FOR TRANSMITTING ELECTROMAGNETIC WAVES

(71) Applicant: Infineon Technologies AG, Neubiberg (DE)

(72) Inventors: Stefano Di Martino, Graz (AT); Dominik Amschl, Feldkirchen bei Graz (AT); Thomas Thurner, Graz (AT)

(73) Assignee: Infineon Technologies AG, Neubiberg (DE)

( * ) Notice: Subject to any disclaimer, the term of this patent is extended or adjusted under 35 U.S.C. 154(b) by 443 days.

(21) Appl. No.: 18/193,196

(22) Filed: Mar. 30, 2023

(65) Prior Publication Data

US 2023/0327310 A1 Oct. 12, 2023

(30) Foreign Application Priority Data

Apr. 7, 2022 (EP) .................................... 22167101

(51) Int. Cl.
*H01P 3/12* (2006.01)
*H01P 5/00* (2006.01)

(52) U.S. Cl.
CPC . *H01P 3/12* (2013.01); *H01P 5/00* (2013.01)

(58) Field of Classification Search
CPC ............... H01P 3/12; H01P 5/00; H01P 5/107
See application file for complete search history.

(56) References Cited

U.S. PATENT DOCUMENTS 6,822,528 B2 * 11/2004 Dawn ..................... H01P 5/107 333/33
7,276,987 B2 * 10/2007 Koriyama ............... H01L 23/66 333/246
2006/0124244 A1 6/2006 Ishii et al.
2018/0375185 A1 12/2018 Kirino et al.
2021/0341679 A1 11/2021 Cuno, Jr. et al.

FOREIGN PATENT DOCUMENTS

CN 210838046 U 6/2020
CN 113937448 A 11/2022
JP 08139504 A * 5/1996
KR 101009615 B1 12/2009

* cited by examiner

*Primary Examiner* — Andrea Lindgren Baltzell
*Assistant Examiner* — Kimberly E Glenn
(74) *Attorney, Agent, or Firm* — Harrity & Harrity, LLP

(57) ABSTRACT

An apparatus for detachably coupling with a printed circuit board to transfer electromagnetic waves. The apparatus includes a coupling element. The coupling element includes a first wave transmission structure configured to receive the electromagnetic waves from the printed circuit board and to transmit the electromagnetic waves along the first wave transmission structure. The apparatus further includes a vacuum channel structure including an inlet for coupling the apparatus to a vacuum generator to generate a vacuum between a first surface of the coupling element and a second surface of the printed circuit board such that a force between the coupling element and the printed circuit board is applied.

20 Claims, 5 Drawing Sheets

APPARATUS, A SYSTEM AND A METHOD FOR TRANSMITTING ELECTROMAGNETIC WAVES

CROSS REFERENCE TO RELATED APPLICATION

This application claims priority to European Patent Application No. 22167101 filed on Apr. 7, 2022, the content of which is incorporated by reference herein in its entirety.

TECHNICAL FIELD

The present disclosure relates to the transmission of electromagnetic waves from a printed circuit board (PCB) to an apparatus for detachably coupling with the printed circuit board.

BACKGROUND

Various electromagnetic wave measurements are typically needed during the development process of semiconductor chips configured to radiate electromagnetic waves. Such measurements may use waveguide elements which are mechanically screwed to a printed circuit board via a waveguide flange in order to receive the electromagnetic waves from the printed circuit board. The received electromagnetic waves are then transferred within a waveguide of the waveguide element towards a testing equipment. The transfer of the electromagnetic waves requires a connection of the waveguide flange to the printed circuit board onto which the semiconductor chip is mounted as a device under test (DUT). The connected waveguide flange should provide a leak-less transmission and a propagation of the electromagnetic waves with a predefined impedance along the structures that are connecting the printed circuit board with the testing equipment. To this end multiple screws are employed to mechanically connect a waveguide flange to the printed circuit board.

A mounting operation of a single waveguide flange onto the printed circuit board using screws consumes time and effort. The time and effort become even more pronounced when more waveguide connections are needed. The increase in the number of waveguide connections to the printed circuit board increases the number of waveguide flanges to be attached to the printed circuit board, which in turn increases the number of screws to be screwed to the printed circuit board. This increase in the number of screws for mounting the waveguide flanges onto the printed circuit board implies an even greater amount of time and effort.

Henceforth, there is a necessity for a more efficient approach for detachably coupling a wave transmission structure with a printed circuit board for receiving electromagnetic waves from the printed circuit board.

This is achieved by the subject matter of the independent claims of the disclosure. Further implementations according to the disclosure are defined by the subject matter of the dependent claims of the disclosure.

SUMMARY

An aspect of the disclosure relates to an apparatus for detachably coupling with a printed circuit board to transfer electromagnetic waves. The apparatus comprises a coupling element having a first wave transmission structure. The first wave transmission structure is configured to receive the electromagnetic waves from the printed circuit board and to transmit the electromagnetic waves along the first wave transmission structure. The apparatus further comprises a vacuum channel structure. The vacuum channel structure comprises an inlet for coupling the apparatus to a vacuum generator to generate a vacuum between a first surface of the coupling element and a second surface of the printed circuit board. The generated vacuum applies a force between the coupling element and the printed circuit board.

According to some implementations of the disclosure, the apparatus further includes first means for aligning the coupling element with the printed circuit board. In one implementation, the first means can comprise a plurality of pins for aligning the coupling element with the printed circuit board. According to some implementations, the apparatus further comprises an opening coupled with the inlet for sucking air from the opening to the inlet.

In some implementations of the disclosure, the coupling element further includes a structure for receiving a vacuum sealing element on the first surface of the coupling element. The vacuum sealing element can be configured to generate a seal between the first surface of the coupling element and the second surface of the printed circuit board. According to some implementations, the coupling element further comprises a flat structure for coupling with a flat surface of the printed circuit board. The coupling of the flat structure with a flat surface of the printed circuit board generates a seal between the first surface of the coupling element and the second surface of the printed circuit board. The coupling element further comprises a recess having a boundary section which forms the first surface of the coupling element. The inlet of the coupling element can be coupled to the recess in order to suck air from the recess to the inlet.

In some implementations, the first wave transmission structure of the coupling element may extend to a third surface of the coupling element. The third surface of the coupling element further comprises means for detachably coupling the coupling element with a wave transmission element to transmit the electromagnetic waves from the first wave transmission structure of the coupling element to a second wave transmission structure of the wave transmission element.

In an implementation of the disclosure, the coupling element further comprises mounting means for detachably mounting the wave transmission element to the coupling element. The coupling element may further comprise means for aligning the wave transmission element with the coupling element.

In some implementations, the coupling element may comprise a plurality of first wave transmission structures.

According to some implementations, the first wave transmission is configured as a mm-wave transmission structure.

An aspect of the disclosure relates to a system comprising a printed circuit board and an apparatus as disclosed above. The apparatus comprises first means for aligning the coupling element with the printed circuit board. The printed circuit board comprises means for cooperative mechanical coupling with the first means of the coupling element such that the coupling element is aligned with the printed circuit board.

In an implementation of the disclosure, the printed circuit board further comprises a board wave transmission structure. The board wave transmission structure can be configured to transmit the electromagnetic waves from a semiconductor chip to a wave coupling structure on the printed circuit board. The wave coupling structure can be configured to couple the electromagnetic waves from the printed circuit board to the first wave transmission structure of the coupling element. The first wave transmission structure of the coupling element can be coupled to a radio frequency (RF) testing device. The RF testing device can receive the electromagnetic waves from the first wave transmission structure. The RF testing device is configured to analyze at least one property of the electromagnetic waves.

A further aspect of the disclosure relates to a method for transferring electromagnetic waves from a board wave transmission structure arranged on a printed circuit board to a first wave transmission structure of a coupling element. The method comprises generating a vacuum between a first surface of the coupling element and a second surface of the printed circuit board such that a force is applied between the coupling element and the printed circuit board. The method further includes transmitting the electromagnetic waves from the board wave transmission structure to the first wave transmission structure.

In some implementations, generating the vacuum includes sucking air from an opening formed in the coupling element to an inlet connected to a vacuum generator.

In an implementation of the disclosure, the method further includes after generating the vacuum between the coupling element and the printed circuit board a breaking of the vacuum by allowing air to flow into the opening of the coupling element and a detaching of the coupling element from the printed circuit board.

According to further implementations of the disclosure, the method further comprises generating a further vacuum between the first surface of the coupling element and a further second surface of a further printed circuit board. Generating the further vacuum applies a force between the coupling element and the further printed circuit board. The further printed circuit board comprises a further board wave transmission structure and further electromagnetic waves are transmitted from the further board wave transmission structure to the first wave transmission structure of the coupling element.

Further implementations of the method comprise coupling a wave transmission element to the coupling element. The wave transmission element comprises a second wave transmission structure. The method includes transmitting the further electromagnetic waves from the first wave transmission structure of the coupling element via the second wave transmission structure to an RF testing device.

BRIEF DESCRIPTION OF THE DRAWINGS

The drawings are not necessarily to scale, emphasis instead generally being placed upon illustrating the principles of the disclosure. The implementations of the disclosure are illustrated by way of example and not by way of limitation in the FIGS. of the accompanying drawings. In the following description, various implementations of the disclosure are described with reference to the following drawings, in which.

DETAILED DESCRIPTION

In this section several implementations of this disclosure are explained with reference to the appended drawings. Whenever the shapes, relative positions and other aspects of the implementations described in the implementations are not clearly defined, the scope of the disclosure is not limited only to the implementations shown, which are meant merely for the purpose of illustration.

Figure 1:
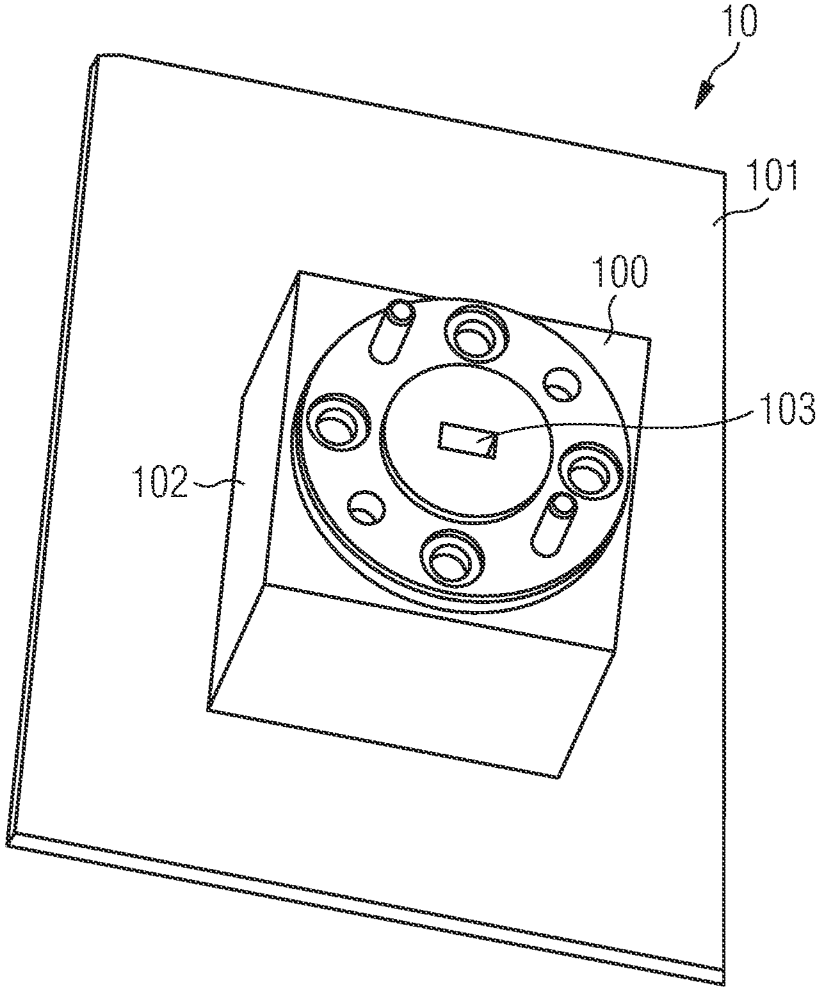
FIG. 1 shows a system of a printed circuit board and an apparatus.

FIG. 1 shows a system 10 of a printed circuit board 101 and an apparatus 100 according to an implementation of the present disclosure. The apparatus 100 comprises a coupling element 102 and a first wave transmission structure 103 arranged in a body of the coupling element 102. FIG. 1 shows the system 10 in a coupled state in which the apparatus 100 is coupled to a surface of the printed circuit board 101 by a vacuum force such that the apparatus 100 is mechanically connected with the printed circuit board 101. The vacuum force may be generated using specific structures provided in the coupling element 102 as will be described in more detail further below.

The first wave transmission structure 103 of the coupling element 102 is configured to receive in the coupled state electromagnetic waves from the printed circuit board 101. The electromagnetic waves are transferred along the first wave transmission structure 103 towards a testing device (not shown) in order to analyze specific features of the transmitted waves. To transfer the electromagnetic waves to the testing device, the first wave transmission structure 103 may be directly coupled to the testing device or a further wave transmission element may be coupled between the testing device and the coupling element 102. The first wave transmission structure 103 can be an integrated part of the coupling element 102. In some implementations, the coupling element 102 may be formed from a piece of metal and the first wave transmission structure 103 is formed by a cavity of the coupling element 102. Optionally, the first wave transmission structure 103 can also be a segregated part that is inserted into the coupling element 102.

Figure 2:
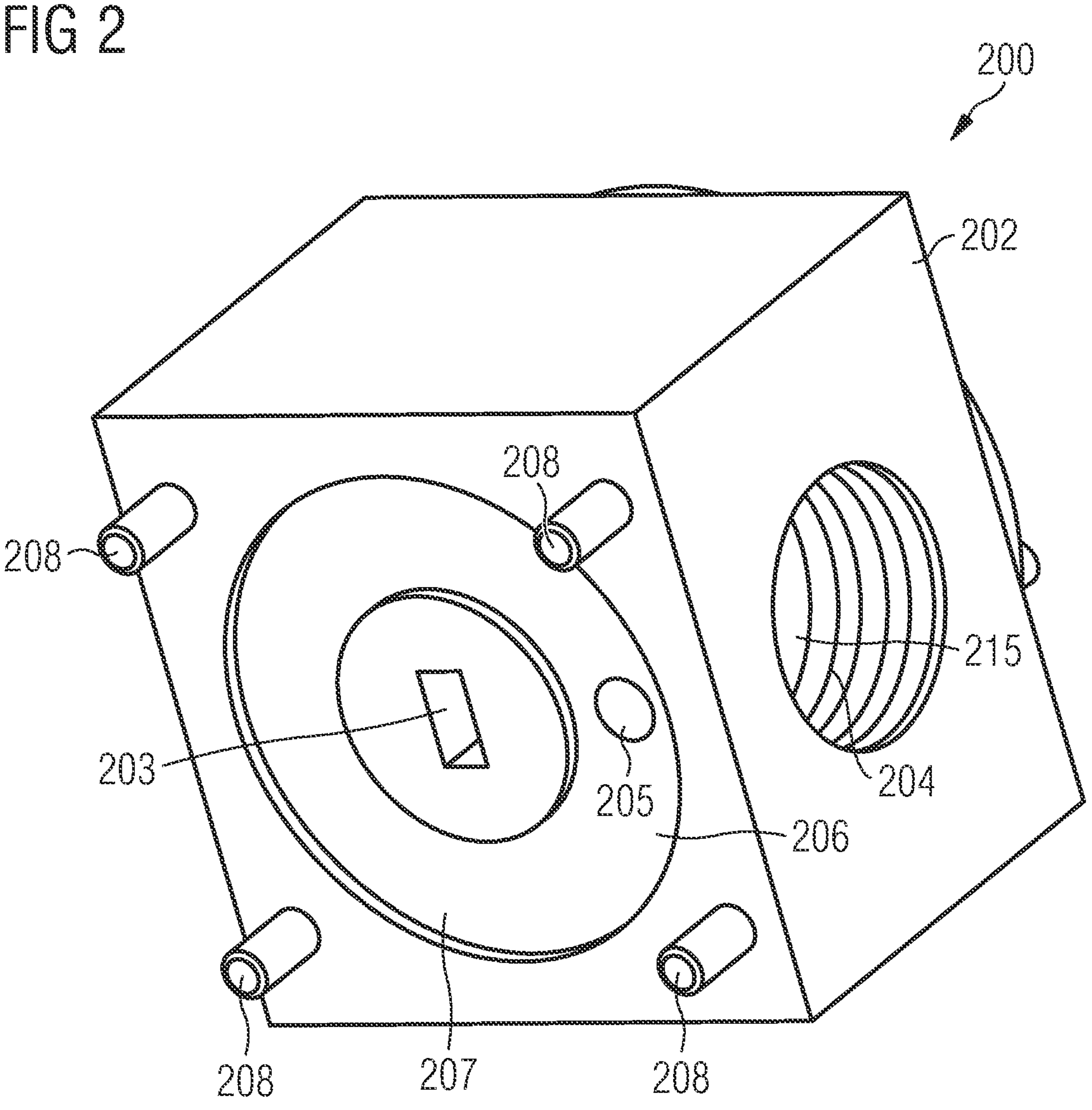
FIG. 2 shows a perspective view of an apparatus.

FIG. 2 shows a perspective view of an apparatus 200, which may be similar or identical to the apparatus 100 shown in FIG. 1. The apparatus 200 comprises a coupling element 202, which includes a first wave transmission structure 203. A recess 206 is formed in the coupling element 202 on a side intended to face the printed circuit board. An inlet 204 is arranged in a sidewall of the coupling element 202. The recess 206 is connected to an opening 205 which forms an end portion of a vacuum channel structure 215 provided in the body of the coupling element 202. An inlet 204 connected to the vacuum channel structure 215 is arranged in a sidewall of the coupling element 202.

The inlet 204 is connected to the recess 206 through the vacuum channel structure 215 and the opening 205 such that air can be sucked from the recess 206 to the inlet 204. A boundary section of the recess 206 can form a first surface 207. The recess 206 is shown in FIG. 2 with a circular cross section however in other implementations the recess 206 can be formed in other shapes. In the coupled state, the first surface 207 of the recess 206 forms together with a surface of the printed circuit board walls of a vacuum chamber. The recess may have an area between 100 and 2000 $mm^2$ and a depth between 1 to 5 mm resulting in a volume of the recess between 100 $mm^3$ and 10000 $mm^3$. The above-described ranges allow generating sufficient vacuum force for coupling the apparatus 200 with a printed circuit board. First means 208 for aligning the coupling element 202 with the printed circuit board are arranged approximately at corners of the surface. Alternatively, the first means 208 for aligning can be arranged at other locations on the surface facing the printed circuit board. According to implementations, the first means 208 for aligning may, for example, be configured as pins (as shown in FIG. 2), protrusions or other alignment structures of any shape capable to align the coupling element 202 with a printed circuit board.

As indicated in FIG. 2, the inlet 204 can be formed by drilling a hole into the sidewall of the coupling element 202. The inlet 204 shown in FIG. 2 has a threaded section. Alternatively, the inlet 204 can be formed in other shapes. The inlet 204 can be coupled to a vacuum generator such as a rotational vacuum pump. For connecting the coupling element 202 to the vacuum generator, a hose can be mounted on the coupling element 202. The hose can be a flexible or a stiff hose. The hose is connected to the vacuum generator for sucking the air from the recess 206 via the opening 205 to the inlet 204 and further to the vacuum generator.

As described above, the first wave transmission structure 203 receives electromagnetic waves from a printed circuit board and transmits the electromagnetic waves along the first wave transmission structure 203 towards the testing device.

In implementations, the apparatus 200 can be coupled to a printed circuit without using an additional separate vacuum sealing element. To this end, the first surface 207 of the coupling element 202 may have a flat structure as shown in FIG. 2 to cooperate with a flat surface of the printed circuit board in order to form a vacuum seal.

In an implementation, the recess 206 can optionally receive a vacuum sealing element. This vacuum sealing element can be configured to form a seal between the first surface 207 of the coupling element 202 and a surface of a printed circuit board. The vacuum sealing element can for example include a sealing ring.

In an implementation, the first wave transmission structure 203 can be configured as a waveguide or any structure that can receive and transmit electromagnetic waves. The waveguide may for example be a rectangular waveguide, a circular waveguide, an elliptical waveguide, a single-ridged waveguide, a double-ridged waveguide or an optical waveguide. The walls of the waveguide may comprise copper, aluminum, brass or other metals. An inner surface of the waveguide may be coated with gold or silver to reduce transmission losses. Alternatively, the waveguide may be formed from other materials such a plastic material. In some implementations, the waveguide may be configured to transfer millimeter-waves.

As can be seen in FIG. 2, the first wave transmission structure 203 is located outside of the area of the recess 206 in order to allow a contact or close distance to the printed circuit board in the coupled state. Alternatively, the first wave transmission structure 203 may be located inside the area of the recess 206.

Figure 3:
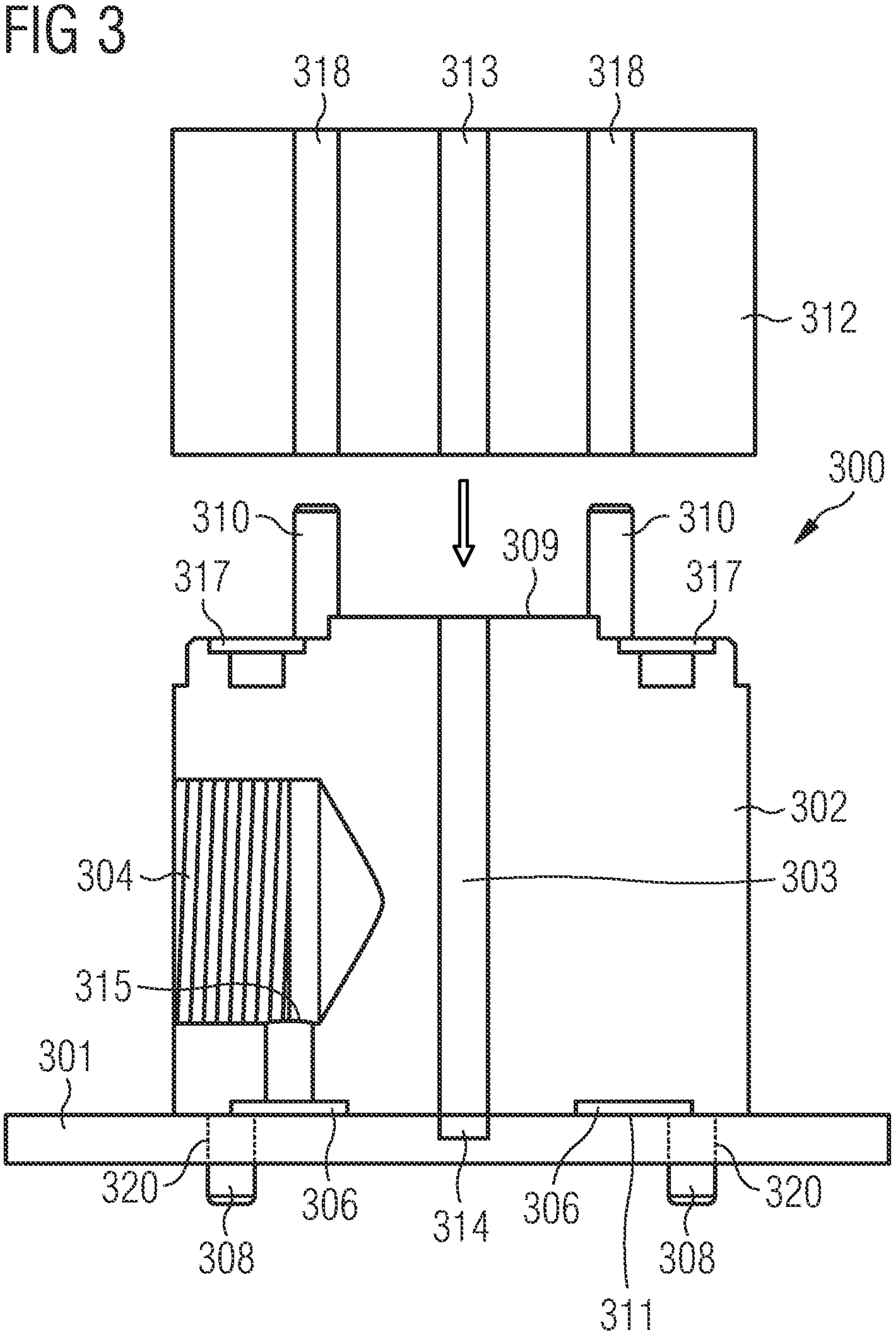
FIG. 3 shows a cross-sectional view of a printed circuit board, an apparatus and a wave transmission element.

Referring now to FIG. 3, a cross-sectional view of a system 300 comprising a coupling element 302 and a printed circuit board 301 is shown in the coupled state. The system 300 may be similar or identical to the system 10 shown in FIG. 1 and the coupling element 302 shown in FIG. 3 may be similar or identical to the coupling element 202 shown in FIG. 2.

As shown in FIG. 3, the coupling element 302 includes an inlet 304, a recess 306, a vacuum channel structure 315 and a first wave transmission structure 303. The coupling element 302 further has first means 308 for aligning with the printed circuit board 301. As can be seen from FIG. 3, the first means 308 for aligning are arranged on a surface of the coupling element 302. The structure and function of these elements have been described with respect to FIG. 1 and FIG. 2 and will not be repeated here.

The printed circuit board 301 comprises a second surface 311, a wave coupling structure 314 and means 320 for cooperative mechanical coupling with the first means 308 for aligning.

Figure 4:
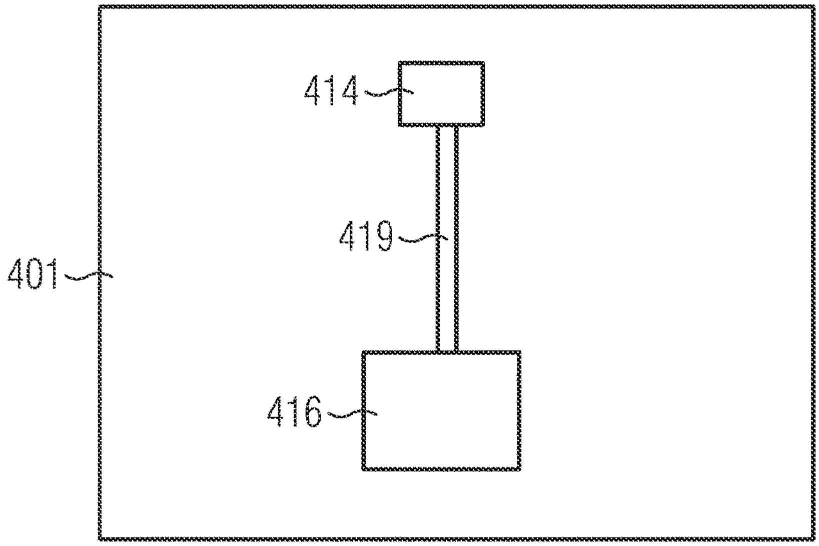
FIG. 4 shows a schematic arrangement of a semiconductor chip, a board wave transmission structure and a wave coupling structure on a printed circuit board.

The first means 308 for aligning are used to mechanically align the coupling element 302 with the means 320 for cooperative mechanical coupling. The first means 308 for aligning may specifically be pins or protrusions or other alignment structures. The means 320 for cooperative mechanical coupling may be formed by holes having a diameter matched to the first means 308 for aligning. FIG. 4 shows the first means 308 for aligning to extend throughout the means 320 for cooperative mechanical coupling and beyond the printed circuit board 301. In other implementations, the first means 308 for aligning may not extend beyond the printed circuit board 301.

The wave coupling structure 314 is configured to couple electromagnetic waves from the printed circuit board 301 to the first wave transmission structure 303 of the coupling element 302. The above-described cooperative mechanical coupling allows providing a precise lateral alignment of the wave transmission structure 303 with the coupling structure 314 in order to reduce transmission losses.

The coupling element 302 can be coupled to the printed circuit board 301 at one main surface of the printed circuit board 301 while the wave coupling structure 314 is arranged on an opposing main surface of the printed circuit board 301. The coupling element 302 can also be coupled to the printed circuit board 301 at the same main surface of the printed circuit board 301 on which the wave coupling structure 314 is integrated in the printed circuit board 301.

The first wave transmission structure 303 extends inside a body of the coupling element 302 from a surface of the coupling element 302, which faces the printed circuit board 301, to a third surface 309 of the coupling element 302. Means 310 for aligning a wave transmission element 312 with the coupling element 302 and mounting means 317 for detachably mounting the wave transmission element 312 to the coupling element are arranged on the third surface 309. The means 310 for aligning may specifically include pins for aligning with holes or holes for aligning with pins. The mounting means 317 may include threaded holes for receiving screws to allow mounting of the wave transmission element 312 with the coupling element 302.

The wave transmission element 312 comprises a second wave transmission structure 313 and holes 318. The holes 318 of the wave transmission element 312 can be used for aligning with the means 310 for aligning provided on the coupling element 302 for detachably coupling the wave transmission element 312 to the coupling element 302. The first wave transmission structure 303 of the coupling element 302 can be configured to receive electromagnetic waves from the wave coupling structure 314 of the printed circuit board 301 and to transfer the electromagnetic waves to the second wave transmission structure 313 of the wave transmission element 312. The second wave transmission structure 313 receives the electromagnetic waves from the first wave transmission structure 303 of the coupling element 302 for transmission to an RF testing device. The second wave transmission structure 313 can be a waveguide or a structure configured to transmit electromagnetic waves as previously described. The RF testing device receives the electromagnetic waves from the wave transmission element 312 and analyzes at least one property of the electromagnetic waves. The electromagnetic waves may in some implementations have a frequency range of 60 GHz to 90 GHz. The analyzed properties of the electromagnetic waves can be a power or a spectrum or phase noise of the transmitted electromagnetic signal. In some implementations, the RF testing device may be capable of performing complete Radar tests with a Radar target stimulator.

With reference to FIG. 4, an aspect of the disclosure shows a top view of a printed circuit board 401. The printed circuit board 401 comprises a semiconductor chip 416 and a wave coupling structure 414. The semiconductor chip 416 and the wave coupling structure 414 are connected via a board wave transmission structure 419. The board wave transmission structure 419 can be configured to transfer electromagnetic waves from the semiconductor chip 416 to the wave coupling structure 414. The semiconductor chip 416 can either be positioned on a surface of the printed circuit board 401 or can also be integrated in the printed circuit board 401. Similarly, the board wave transmission structure 419 shown in FIG. 5 can either be positioned on a surface of the printed circuit board 401 or can also be integrated in the printed circuit board 401. The semiconductor chip 416 is configured to generate the electromagnetic waves which may be coupled from the semiconductor chip to the board wave transmission structure 419. The board wave transmission structure 419 may for example be a microstrip line, a stripline, a grounded coplanar waveguide or a similar transmission line.

Figure 6:
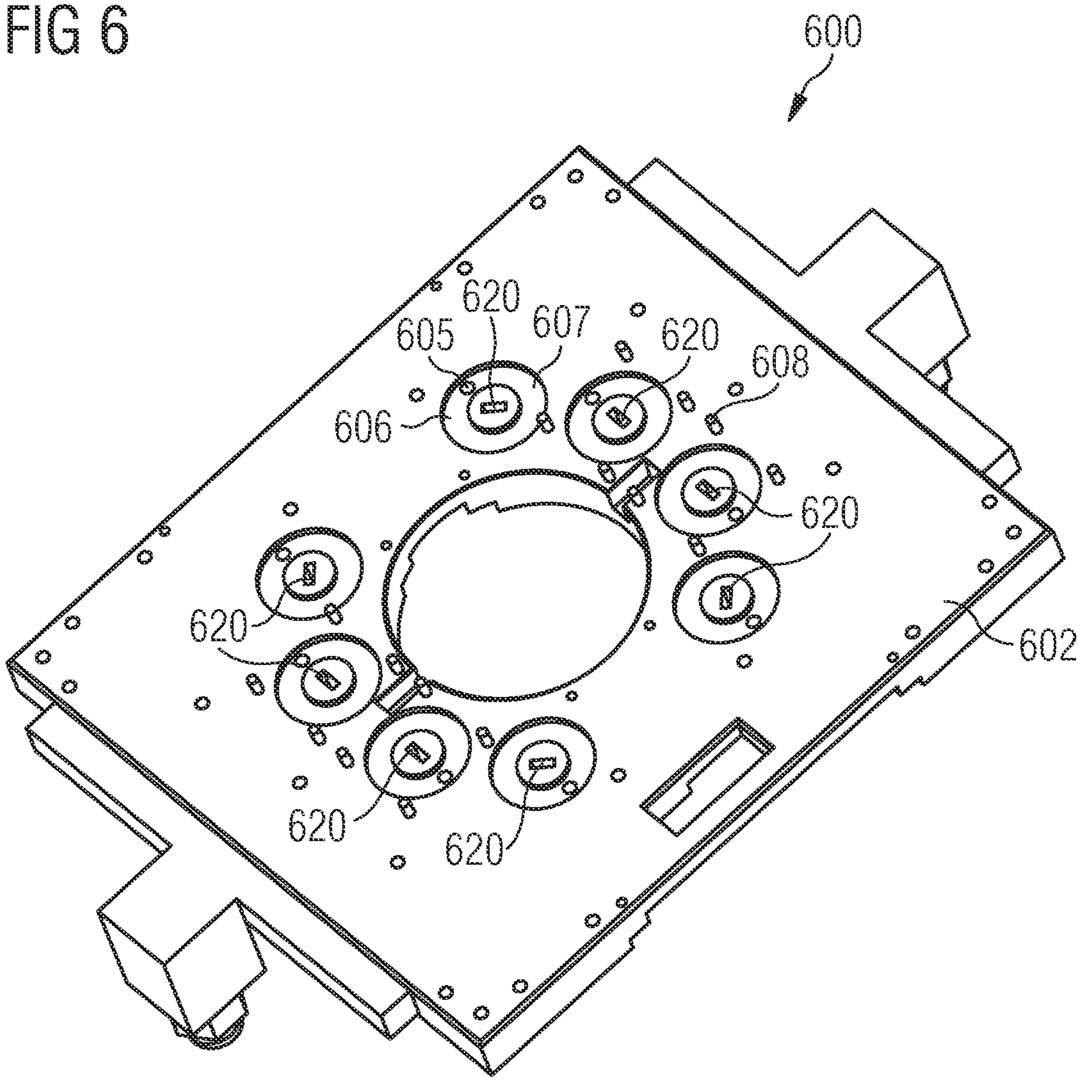
FIG. 6 shows an apparatus with multiple first wave transmission structures.

With reference to FIG. 6 an alternative implementation of an apparatus 600 is shown in which a coupling element 602 comprises a plurality of first wave transmission structures 620. Similar to the previous implementations, the apparatus 600 can be coupled to a printed circuit board utilizing first means 608 for aligning. The coupling element 602 further comprises a recess 606, an opening 605 and a first surface 607 as described previously. The coupling element 602 can be coupled to multiple wave coupling structures of a printed circuit board to transfer electromagnetic waves from multiple semiconductor chips. Each recess 606 associated with a respective one of the first wave transmission structures 620 is connected to a single inlet of the coupling element 602 not shown in FIG. 6 for connecting to a single vacuum generator to allow sucking air from each recess.

Figure 5:
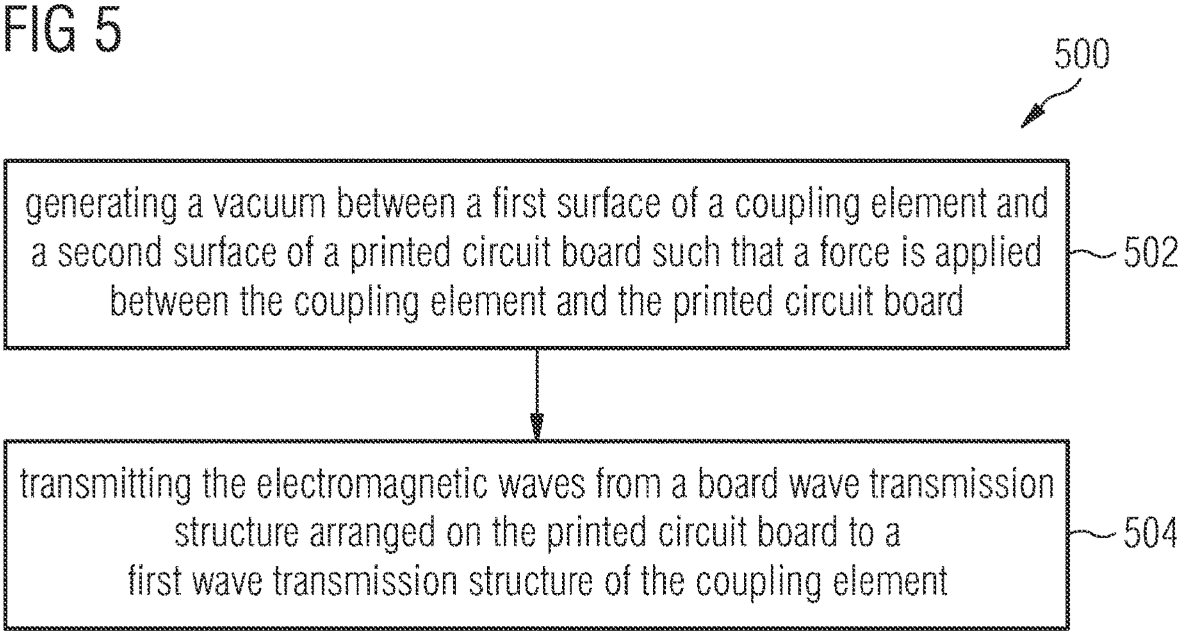
FIG. 5 shows a flow diagram of a method for transferring electromagnetic waves from a printed circuit board to a coupling element of an apparatus.

FIG. 5 shows a flow chart of a method 500 for transferring electromagnetic waves from a board wave transmission structure arranged on a printed circuit board to a first wave transmission structure of a coupling element in accordance with implementations of the present disclosure.

At step 502, a vacuum is generated between a first surface of the coupling element and a second surface of the printed circuit board such that a force is applied between the coupling element and the printed circuit board.

At step 504, the electromagnetic waves are transmitted from the board wave transmission 419 structure to the first wave transmission structure.

The disclosure, however, is not limited to the steps 502, 504 provided by the flowchart of the method 500. Rather, it will be apparent to persons skilled in the relevant art from the teachings provided herein that other functional flowcharts are within the scope and spirit of the present disclosure of the method 500. Flowchart 500 will be described with continued reference to example implementations described above, though the method is not limited to those implementations.

ASPECTS

In an aspect of the disclosure, the generating 502 of the vacuum may include sucking air from an opening formed in the coupling element to an inlet connected to a vacuum generator.

According to one implementation of the disclosure, a further step of the method 500 may include after generating the vacuum 501 the breaking of the vacuum by allowing air to flow into the opening and detaching the coupling element from the printed circuit board.

In a further implementation of the disclosure, a further step of the method 500 may comprise attaching a further printed circuit board to the coupling element. This step may include generating a further vacuum between the first surface of the coupling element and a further second surface of a further printed circuit board such that a force is applied between the coupling element and the further printed circuit board. The further printed circuit board comprises a further board wave transmission structure and a subsequent step may include transmitting further electromagnetic waves from the further board wave transmission structure to the first wave transmission structure.

According to an aspect of the disclosure, the method 500 further comprises a step of coupling a wave transmission element to the coupling element. The wave transmission element can comprise a second wave transmission structure. This step may further include transmitting the further electromagnetic waves from the first wave transmission structure via the second wave transmission structure to an RF testing device.

With reference to all the above implementations, an apparatus can be detachably coupled to a printed circuit board by generating a vacuum between a first surface of the coupling element and a second surface of the printed circuit board. The vacuum applies a force between the first surface of the coupling element and the second surface of the printed circuit board.

The vacuum can be generated by connecting an inlet to a vacuum generator via a hose and switching on the vacuum generator to suck air from an opening formed in a recess of the first surface of the coupling element via a vacuum channel structure to the inlet.

The detaching of the apparatus from the printed circuit board can be accomplished by switching off the vacuum generator or decoupling from the inlet.

Vacuum referred in the above implementations may not be restricted to a specific class of vacuum and may include rough vacuum, medium vacuum, high vacuum or even beyond high vacuum. In some implementations, a small leakage may be allowed, without compromising the capability to generate the required vacuum force between the coupling element and the printed circuit board.

What is claimed is:

1. An apparatus for detachably coupling with a printed circuit board to transfer electromagnetic waves, the apparatus comprising:

a coupling element comprising a first wave transmission structure configured to receive the electromagnetic waves from the printed circuit board and to transmit the electromagnetic waves along the first wave transmission structure; and a vacuum channel structure comprising an inlet for coupling the apparatus to a vacuum generator to generate a vacuum between a first surface of the coupling element and a second surface of the printed circuit board such that a force between the coupling element and the printed circuit board is applied.

2. The apparatus according to claim 1, wherein the apparatus comprises first means for aligning the coupling element with the printed circuit board.

3. The apparatus according to claim 2, wherein the first means for aligning the coupling element with the printed circuit board comprises a plurality of pins for aligning the coupling element with the printed circuit board.

4. The apparatus according to claim 1, wherein the apparatus comprises an opening coupled with the inlet for sucking air from the opening to the inlet.

5. The apparatus according to claim 1, wherein the coupling element comprises a structure for receiving a vacuum sealing element on the first surface of the coupling element for generating a seal between the first surface of the coupling element and the second surface of the printed circuit board.

6. The apparatus according to claim 1, wherein the coupling element comprises a flat structure for coupling with a flat surface of the printed circuit board to generate a seal between the first surface of the coupling element and the second surface of the printed circuit board.

7. The apparatus according to claim 1, wherein the coupling element comprises a recess, wherein a boundary section of the recess forms the first surface of the coupling element.

8. The apparatus according to claim 7, wherein the inlet is coupled to the recess to suck air from the recess to the inlet.

9. The apparatus according to claim 1, wherein the first wave transmission structure extends to a third surface of the coupling element, wherein the third surface comprises means for detachably coupling a wave transmission element to the coupling element to transmit the electromagnetic waves to a second wave transmission structure of the wave transmission element.

10. The apparatus according to claim 9, wherein the coupling element comprises at least one of:

mounting means for detachably mounting the wave transmission element to the coupling element; or means for aligning the wave transmission element with the coupling element.

11. The apparatus according to any of claim 1, wherein the coupling element comprises a plurality of first wave transmission structures.

12. A system comprising:

a printed circuit board; and an apparatus comprising:

a coupling element comprising a first wave transmission structure configured to receive electromagnetic waves from the printed circuit board and to transmit the electromagnetic waves along the first wave transmission structure; and a vacuum channel structure comprising an inlet for coupling the apparatus to a vacuum generator to generate a vacuum between a first surface of the coupling element and a second surface of the printed circuit board such that a force between the coupling element and the printed circuit board is applied.

13. The system according to claim 12, wherein the apparatus comprises first means for aligning the coupling element with the printed circuit board, and wherein the printed circuit board comprises means for cooperative mechanical coupling with the first means to align the coupling element with the printed circuit board.

14. The system according to claim 12, wherein the printed circuit board comprises;

a board wave transmission structure for transmitting the electromagnetic waves from a semiconductor chip to a wave coupling structure on the printed circuit board, wherein the wave coupling structure is configured to couple the electromagnetic waves from the printed circuit board to the first wave transmission structure.

15. The system according to claim 12, wherein the first wave transmission structure is coupled to a radio frequency (RF) testing device configured to receive the electromagnetic waves from the first wave transmission structure and to analyze at least one property of the electromagnetic waves.

16. A method for transferring electromagnetic waves from a board wave transmission structure arranged on a printed circuit board to a first wave transmission structure of a coupling element, the method comprising:

generating a vacuum between a first surface of the coupling element and a second surface of the printed circuit board such that a force is applied between the coupling element and the printed circuit board; and transmitting the electromagnetic waves from the board wave transmission structure to the first wave transmission structure.

17. The method according to claim 16, wherein generating the vacuum comprises:

sucking air from an opening formed in the coupling element to an inlet connected to a vacuum generator.

18. The method according to claim 17, further comprising:

after generating the vacuum, breaking the vacuum by allowing air to flow into the opening; and detaching the coupling element from the printed circuit board.

19. The method according to claim 18, further comprising: generating a further vacuum between the first surface of the coupling element and a further second surface of a further printed circuit board such that a force is applied between the coupling element and the further printed circuit board, wherein the further printed circuit board comprises a further board wave transmission structure; and transmitting further electromagnetic waves from the further board wave transmission structure to the first wave transmission structure.

20. A method according to claim 16, further comprising:

coupling a wave transmission element comprising a second wave transmission structure to the coupling element; and transmitting the further electromagnetic waves from the first wave transmission structure via the second wave transmission structure to an RF testing device.

* * * * *